United States Patent
Ortmann et al.

(10) Patent No.: US 10,308,239 B2
(45) Date of Patent: Jun. 4, 2019

(54) POWERSPLIT HYBRID POWERTRAIN WITH OVERDRIVE CLUTCH

(71) Applicant: Ford Global Technologies, LLC, Dearborn, MI (US)

(72) Inventors: Walter Joseph Ortmann, Saline, MI (US); Bernard D. Nefcy, Novi, MI (US); Daniel Scott Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 719 days.

(21) Appl. No.: 14/503,610

(22) Filed: Oct. 1, 2014

(65) Prior Publication Data
US 2016/0096522 A1    Apr. 7, 2016

(51) Int. Cl.
*B60W 20/40* (2016.01)
*B60W 10/02* (2006.01)
(Continued)

(52) U.S. Cl.
CPC .............. *B60W 20/40* (2013.01); *B60K 6/36* (2013.01); *B60K 6/383* (2013.01); *B60K 6/387* (2013.01); *B60K 6/445* (2013.01); *B60W 10/02* (2013.01); *B60W 10/08* (2013.01); *B60W 20/13* (2016.01); *B60W 20/14* (2016.01); *F16D 41/14* (2013.01); *F16D 48/06* (2013.01);
(Continued)

(58) Field of Classification Search
CPC .... F16H 3/727; B60W 2710/021; B60K 6/20; B60K 6/38
See application file for complete search history.

(56) References Cited

U.S. PATENT DOCUMENTS 5,775,449 A * 7/1998 Moroto .................. B60K 6/365
                                                   180/65.235
5,788,006 A * 8/1998 Yamaguchi ............ B60K 6/365
                                                   180/65.235
(Continued)

FOREIGN PATENT DOCUMENTS

CN    202337203 U    7/2012
GB      2473962 B    3/2011

OTHER PUBLICATIONS

Chinese Office Action dated Nov. 2, 2018 for S.N. 201510639903.9, 6 pages.

*Primary Examiner* — Charles A Fox
*Assistant Examiner* — Tinh T Dang
(74) *Attorney, Agent, or Firm* — David Kelley; Brooks Kushman P.C.

(57) ABSTRACT

A hybrid vehicle powertrain includes an internal combustion engine, first and second electric machines, traction wheels, and an output shaft having meshing gears configured to establish a final drive ratio between the output shaft and the traction wheels. The powertrain additionally includes a first mechanical linkage and a second mechanical linkage. The first mechanical linkage is configured to selectively transmit engine torque to the fraction wheels and selectively transmit electric machine torque to the traction wheels. The second mechanical linkage is configured to selectively transmit engine torque to the traction wheels. When transmitting engine torque to the wheels, the second mechanical linkage defines a fixed overdrive speed relationship between the engine and the fraction wheels.

17 Claims, 8 Drawing Sheets

(51) Int. Cl.
  *B60W 10/08* (2006.01)
  *F16H 3/44* (2006.01)
  *F16H 3/72* (2006.01)
  *F16H 59/02* (2006.01)
  *F16H 59/08* (2006.01)
  *B60K 6/20* (2007.10)
  *B60K 6/383* (2007.10)
  *B60K 6/387* (2007.10)
  *B60K 6/26* (2007.10)
  *B60K 6/54* (2007.10)
  *B60K 6/36* (2007.10)
  *B60K 6/445* (2007.10)
  *F16D 41/14* (2006.01)
  *F16D 48/06* (2006.01)
  *B60W 20/13* (2016.01)
  *B60W 20/14* (2016.01)

(52) U.S. Cl.
  CPC ..... *B60W 2510/06* (2013.01); *B60W 2510/18* (2013.01); *B60W 2510/242* (2013.01); *B60W 2520/105* (2013.01); *B60W 2540/10* (2013.01); *B60W 2540/12* (2013.01); *B60W 2710/021* (2013.01); *B60W 2710/08* (2013.01); *F16D 2500/1022* (2013.01); *F16D 2500/1066* (2013.01); *F16D 2500/10462* (2013.01); *F16D 2500/10493* (2013.01); *F16D 2500/30401* (2013.01); *F16D 2500/3101* (2013.01); *F16D 2500/3108* (2013.01); *F16D 2500/3109* (2013.01); *F16D 2500/50858* (2013.01); *Y02T 10/6239* (2013.01); *Y10S 903/93* (2013.01)

(56) References Cited

U.S. PATENT DOCUMENTS

| | | |
|---|---|---|
| 6,003,626 A | 12/1999 | Ibaraki et al. |
| 6,258,006 B1 * | 7/2001 | Hanyu ............... B60K 6/387 |
| | | 475/5 |
| 6,978,854 B1 | 12/2005 | Kuang et al. |
| 8,403,123 B2 | 3/2013 | Bird et al. |
| 8,403,807 B2 * | 3/2013 | Tabata ............... B60K 6/365 |
| | | 180/65.28 |
| 8,425,377 B2 | 4/2013 | Liang et al. |
| 8,740,739 B2 | 6/2014 | Martin et al. |
| 9,073,547 B1 | 7/2015 | Ortmann et al. |
| 9,187,086 B1 | 11/2015 | Nefcy et al. |
| 2012/0241274 A1 | 9/2012 | Lloyd |
| 2014/0194238 A1 * | 7/2014 | Ono .................. B60K 6/445 |
| | | 475/5 |
| 2015/0107407 A1 * | 4/2015 | Park .................. B60K 6/36 |
| | | 74/661 |

* cited by examiner

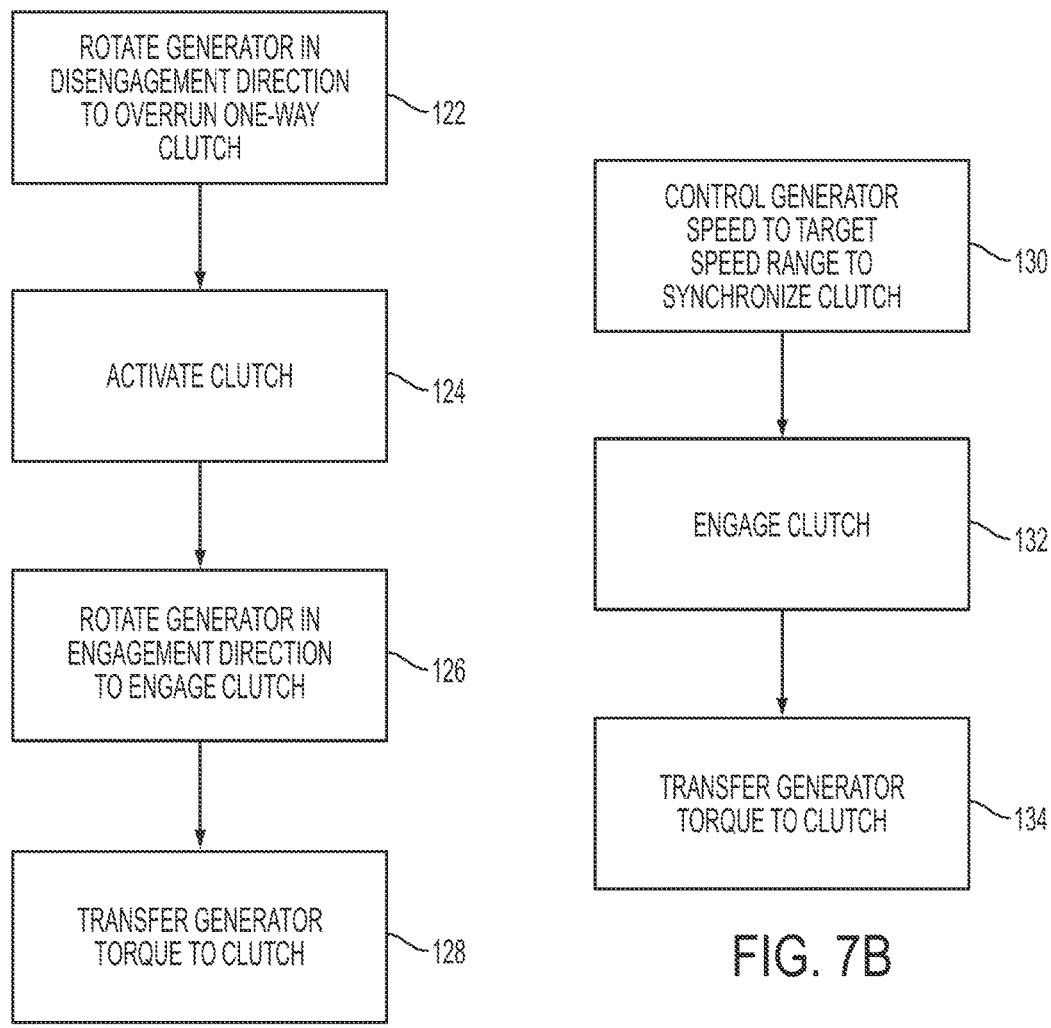

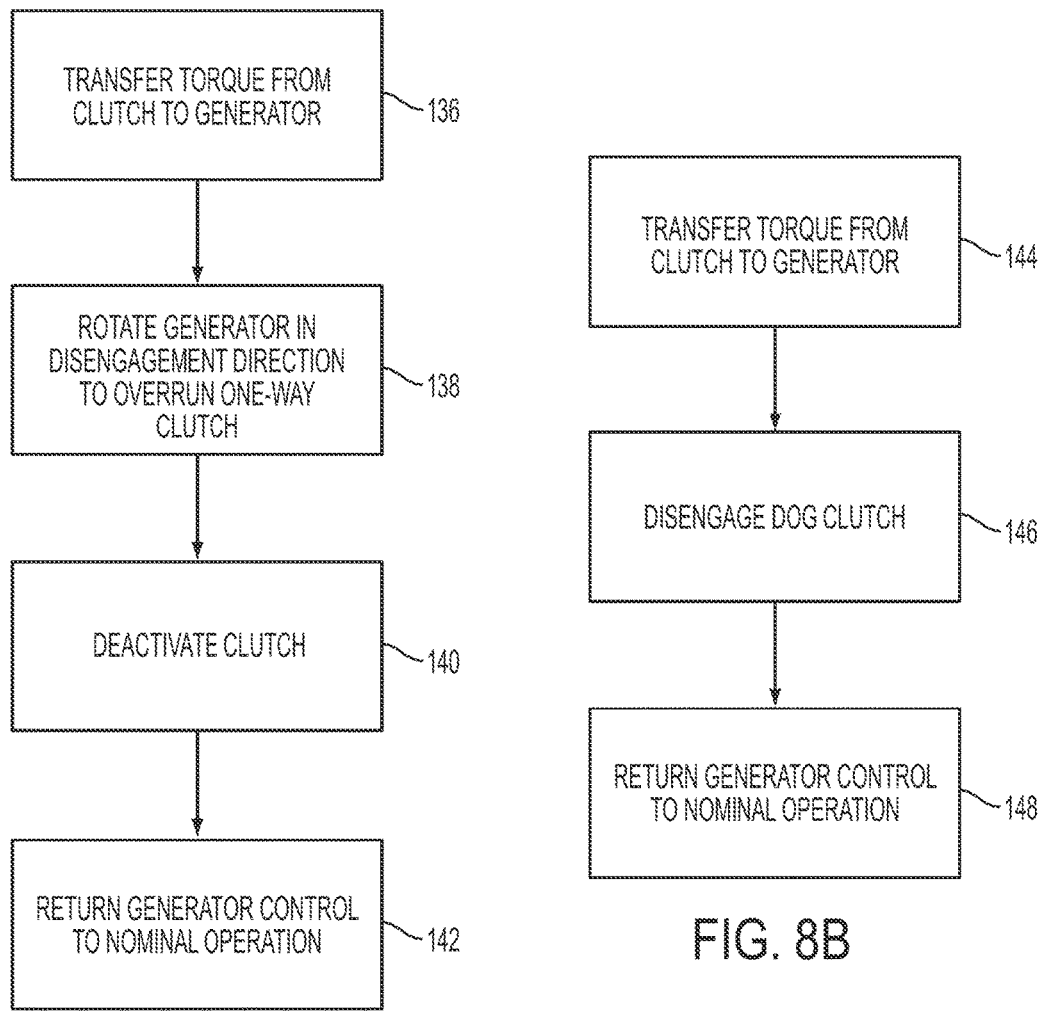

POWERSPLIT HYBRID POWERTRAIN WITH OVERDRIVE CLUTCH

TECHNICAL FIELD

The present disclosure relates to powertrains for hybrid electric vehicles.

BACKGROUND

One class of hybrid electric vehicle powertrains, commonly referred to as a powersplit powertrain, has two sources of power. The first source includes an internal combustion engine, and the second source includes a combination of an electric motor, a generator and a battery. The engine and the generator, together with a planetary gear set, a countershaft and a motor, establish a mechanical torque flow path and an electromechanical torque flow path to vehicle traction wheels. The battery is an energy-storing device for the generator and the motor. Engine power is divided into two power flow paths at any generator speed and vehicle speed. Engine speed is controlled by the generator, which implies that the engine speed can be decoupled from the vehicle speed within the allowed speed range of the generator. This mode of operation is called "positive power split", when the generator is generating electrical power using mechanical power input from the engine.

Because of the mechanical properties of the planetary gear set, the generator can distribute power to the planetary gear set to drive the vehicle. This mode of operation is called "negative power split". The combination of a generator, a motor and a planetary gear set thus can be considered to have electrical continuously variable (e-CVT) transmission characteristics.

A generator brake can be activated so that engine output power is transmitted with a fixed gear ratio to the torque output side of the powertrain through a mechanical path only. The first power source can only effect forward propulsion of the vehicle since there is no reverse gear. The engine requires either generator control or application of a generator brake to transmit output power for forward drive.

When the second power source is active, the electric motor draws power from the battery and drives the vehicle independently of the engine for both forward drive and reverse drive. The motor may also generate power and charge the battery if the engine produces power exceeding driver demand, or in a regenerative mode capturing vehicle kinetic energy. In addition, the generator can draw power from the battery and drive against a one way clutch on the engine power output shaft to propel the vehicle in a forward direction. This mode of operation is called "generator drive mode". A vehicle system controller coordinates the two power sources so that they work together seamlessly to meet a driver's torque demand without exceeding powertrain system limits. The vehicle system controller allows continuous regulation of engine speed for any given vehicle speed and power request. The mechanical power flow path provides efficient power delivery through the planetary gear set to the driveshaft.

SUMMARY

A hybrid vehicle according to the present disclosure includes an internal combustion engine, first and second electric machines, traction wheels, and an output shaft coupled to the traction wheels by meshing gears. The meshing gears are configured to establish a final drive ratio between the output shaft and the traction wheels. The vehicle additionally includes a first gearing arrangement and a second gearing arrangement. The first gearing arrangement, which may include a planetary gear set, is configured to selectively transmit engine torque to the traction wheels and selectively transmit electric machine torque to the traction wheels. The second gearing arrangement, which includes a clutch and which may define an overdrive gear set, is configured to selectively transmit engine torque to the output shaft. When transmitting engine torque to the wheels, the second mechanical linkage defines an overdrive speed and torque relationship between the engine and the output shaft. The vehicle additionally includes a controller. The controller is configured to engage the clutch in response to a first operating condition, maintain the clutch in an engaged position in response to the clutch being engaged and a second operating condition, and disengage the clutch in response to the clutch being engaged and a third operating condition.

The clutch may be, in various embodiments, a dog clutch or a one-way clutch.

The first operating condition may be one of the following: a generally constant driver power demand during a first acceleration event, a decrease in driver power demand and subsequent generally constant driver power demand after a second acceleration event, or a decrease in driver power demand and activation of regenerative braking after a third acceleration event while the engine is on. The second operating condition may include a change in vehicle charging mode. The third operating condition may correspond to one of the following: a decrease in driver power demand that exceeds a first associated threshold, an actuation of a brake pedal that exceeds a second associated threshold, an increase in driver power demand that exceeds a third associated threshold, a generally constant driver power demand and a decrease in vehicle speed that exceeds a fourth associated threshold, or an engine shutdown request.

A method of controlling a hybrid vehicle includes controlling the vehicle in a continuously variable mode and selectively engaging an overdrive mechanical linkage. The vehicle has a powersplit powertrain, providing an electrical power transmission path to vehicle wheels and a first mechanical power transmission path to the vehicle wheels. The vehicle additionally includes an overdrive mechanical linkage that is selectively engageable to transmit engine torque to the vehicle wheels in a fixed speed relationship. The overdrive mechanical linkage may be engaged in response to a first operating condition.

In one embodiment, the powersplit powertrain includes a generator and the overdrive mechanical linkage includes an electromagnetic one-way clutch selectively coupled to the engine. In such an embodiment, engaging the overdrive mechanical linkage includes overrunning the clutch by rotating the generator in a disengagement direction, electronically activating the one-way clutch while overrunning, engaging the activated clutch by rotating the generator in an engagement direction opposite the disengagement direction until the clutch is engaged to prevent further rotation in the engagement direction, transferring engine torque carried by the generator to the activated clutch, and turning off the generator after the engine torque is transferred. In such embodiments, disengaging the overdrive mechanical linkage includes turning on the generator while the clutch is activated and engaged, rotating the generator to overrun and disengage the clutch, and deactivating the clutch while overrunning.

In another embodiment, the powersplit powertrain includes a generator and the overdrive mechanical linkage includes a dog clutch selectively coupled to the engine. In such an embodiment, engaging the overdrive mechanical linkage includes controlling the generator according to a target speed range to synchronize the clutch, engaging the clutch, transferring engine torque carried by the generator to the engaged clutch, and turning off the generator after the engine torque is transferred. In such embodiments, disengaging the overdrive mechanical linkage includes turning on the generator while the clutch is engaged, transferring torque to the generator from the clutch, and disengaging the clutch.

Some embodiments further include maintaining the overdrive linkage in response to a second operating condition. Further embodiments may include disengaging the overdrive mechanical linkage to de-establish the overdrive speed relationship in response to a third operating condition.

A hybrid vehicle according to the present disclosure includes an internal combustion engine, an electric machine, traction wheels, a first mechanical linkage, and a second mechanical linkage. The first mechanical linkage, which includes a planetary gearset, is configured to selectively transmit engine torque to the traction wheels and selectively transmit electric machine torque to the traction wheels. The second mechanical linkage is configured to selectively transmit engine torque to the traction wheels. The second mechanical linkage defines a fixed speed relationship between the engine and the traction wheels when transmitting torque.

BRIEF DESCRIPTION OF THE DRAWINGS

FIGS. 7a and 7b illustrate methods of engaging a one-way clutch and a dog clutch, respectively, according to the present disclosure in flowchart form; and FIGS. 8a and 8b illustrate methods of disengaging a one-way clutch and a dog clutch, respectively, according to the present disclosure in flowchart form.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
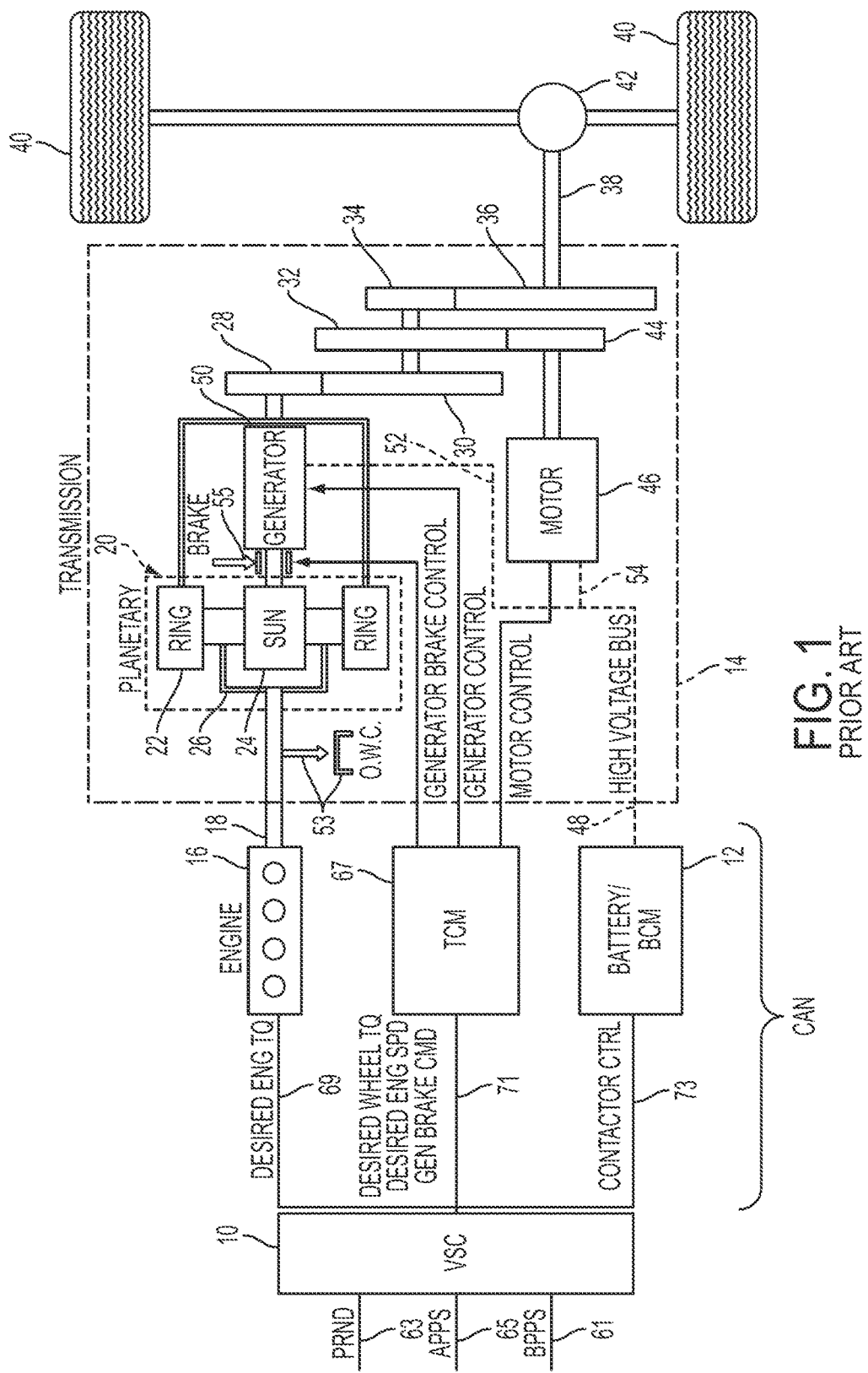
FIG. 1 illustrates a hybrid vehicle having a powersplit powertrain.

Referring now to FIG. 1, a hybrid electric vehicle having a powersplit powertrain is illustrated. The powertrain includes two power sources that are connected to the driveline: (1) an engine 16 and an electric machine 50 (which may be referred to as a generator) connected together via a planetary gear arrangement 20; and (2) an electric drive system including a battery 12, an electric machine 46 (which may be referred to as a motor) and generator 50. Battery 12 is an energy storage system for motor 46 and generator 50.

A vehicle system controller (VSC) 10 is configured to send control signals to and receive sensory feedback information from one or more of battery 12, engine 16, motor 46, and generator 50 in order for power to be provided to vehicle traction wheels 40 for propelling the vehicle. Controller 10 controls the power source proportioning between battery 12 and engine 16 for providing power to propel the vehicle and thereby controls the state of charge (SOC) of battery 12.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. Battery 12 delivers electric power to motor 46 through power flow path 48. Generator 50 is connected electrically to battery 12 and to motor 46, as shown at 52.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 10 issues a desired engine torque request to engine 16, as shown at 69, which is dependent on accelerator pedal position sensor (APPS) output 65. A brake pedal position sensor (BPPS) distributes a wheel brake signal to controller 10, as shown at 61. A brake system control module (not shown) may issue to controller 10 a regenerative braking command based on information from the BPPS. TCM 67 issues a generator brake control signal to generator brake 55. TCM 67 also distributes a generator control signal to generator 50.

If generator brake 55 is activated, a parallel operating mode is established. In the parallel operating configuration, engine 16 is on and generator 50 is braked. Battery 12 powers motor 46, which powers counter shaft 31 simultaneously with delivery of power from engine 16 to planetary 20 to counter shaft 31. During operation with the second power source (described as including battery 12, motor 46, and generator 50), motor 46 draws power from battery 12 and provides propulsion independently from engine 16 to the drivetrain.

Figure 2:
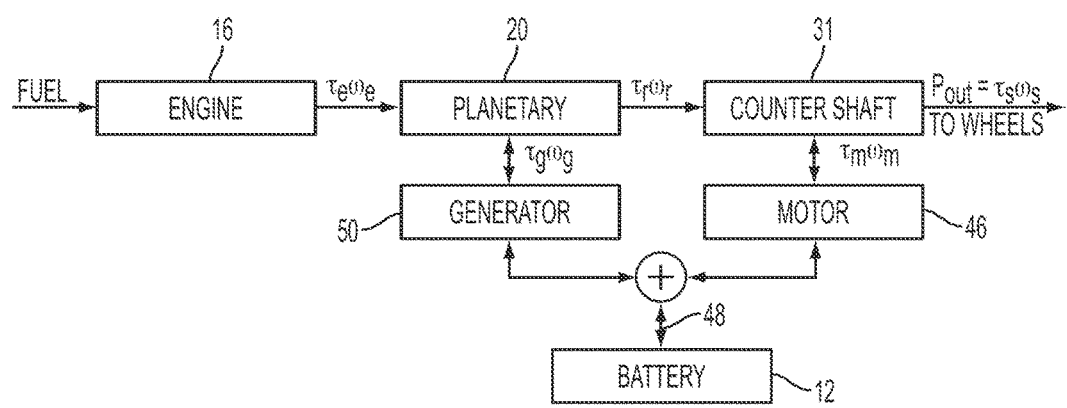
FIG. 2 illustrates torque and speed transmission through a powersplit powertrain.

Referring now to FIG. 2, a block diagram of power flow paths between the various components of the powertrain of FIG. 1 is shown. Fuel is delivered to engine 16 under the control of the driver using an engine throttle. Engine 16 delivers engine power ($\tau_e \omega_e$, where $\tau_e$ is engine torque and $\omega_e$ is engine speed) to planetary arrangement 20. Planetary 20 delivers power ($\tau_r\omega_r$, where $\tau_r$ is the ring gear torque and $\omega_r$ is the ring gear speed) to counter shaft 31. Output shaft 38 outputs power ($P_{out}=\tau_s\omega_s$, where $\tau_s$ and $\omega_s$ are the torque and speed of output shaft 38, respectively) to wheels 40. Generator 50 can deliver power to or be driven by planetary 20. Similarly, power distribution between motor 46 and counter shaft 31 can be distributed in either direction. Driving power from battery 12 or charging power to battery 12 is represented by the bi-directional arrow 48.

The engine output power ($\tau_e\omega_e$) can be split into a mechanical power flow path ($\tau_r\omega_r$) and an electrical power flow path ($\tau_g\omega_g$ to $\tau_m\omega_m$, where $\tau_g$ is the generator torque, $\omega_g$ is the generator speed, $\tau_m$ is the motor torque, and $\omega_m$ is the motor speed). In this so-called positive split mode of operation, engine 16 delivers power to planetary 20 which delivers power ($\tau_r\omega_r$) to counter shaft 31 which in turn drives wheels 40. A portion of the planetary gearing power ($\tau_g\omega_g$) is distributed to generator 50, which delivers charging power to battery 12. Battery 12 drives motor 46, which distributes power ($\tau_m\omega_m$) to counter shaft 31.

As described, the HEV has two power sources for delivering driving power to wheels 40. The first power source includes engine 16 and the second power source includes battery 12. Engine 16 and battery 12 can provide traction power either simultaneously or independently. Controller 10 controls the electric energy and fuel energy proportioning to meet the propulsion requirements and thereby controls engine 16 and battery 12 accordingly.

As may be observed, the planetary gearing arrangement 20 imposes speed and torque relationships among the engine 16, generator 50, and the vehicle traction wheels 40. As discussed above, the generator 50 may be controlled to transfer power from the engine 16 to vehicle traction wheels 40 using the planetary gearing arrangement 20 as a CVT. However, at some operating conditions, the losses incurred by operating the generator 50 exceed the energy benefit of the CVT.

As an example, when the vehicle is in "steady state" operation, such as cruising at a generally constant speed, the generator 50 incurs operational losses, which may exceed one kW, while the gear ratio between the engine 16 and traction wheels 40 remains generally unchanged. Here, steady state operation refers to a constant vehicle speed, constant driver power request, and generally consistent quantity of engine power used to charge the vehicle. This generally occurs when the driver power demand is roughly the same as the "road load", or the sum of forces acting on the vehicle (e.g. rolling resistance, aerodynamic drag, etc.).

Figure 3:
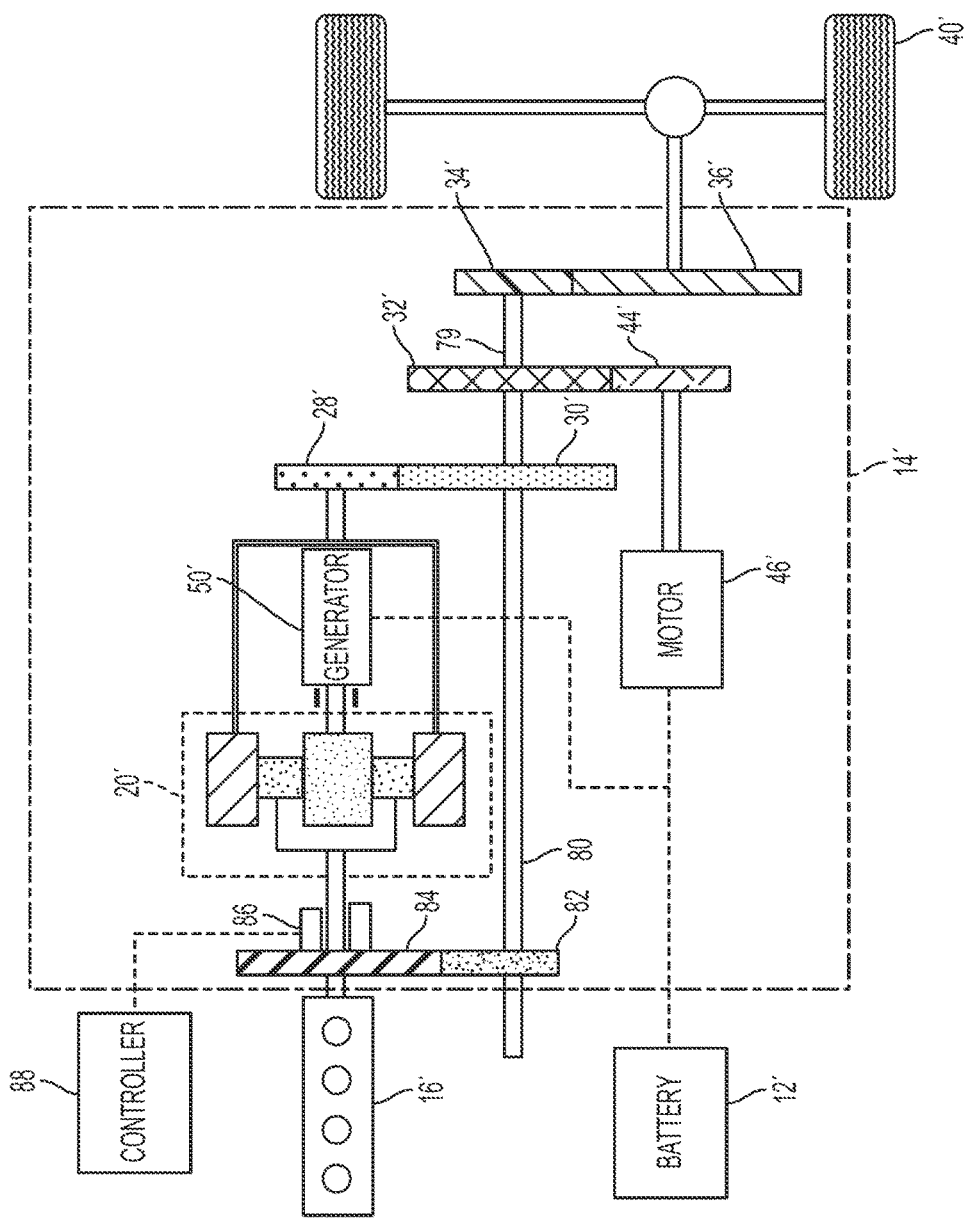
FIG. 3 illustrates a hybrid vehicle having a powertrain according to the present disclosure.

Referring now to FIG. 3, a powertrain according to the present disclosure is illustrated. The powertrain includes two power sources that are connected to the driveline: (1) an engine 16' and a generator 50' connected together via a planetary gear arrangement 20; and (2) an electric drive system including a battery 12', an electric motor 46', and generator 50'. The planetary gearing arrangement 20', in conjunction with meshing gear elements 28', 30', 32', 34', and 36', define a first mechanical linkage between the engine 16', generator 50', and traction wheels 40'. Meshing gear elements 30', 32', and 34' rotate about a common output shaft 79, and meshing gear elements 34' and 36' define a final drive ratio between the output shaft 79 and traction wheels 40'.

In addition, the powertrain includes a parallel overdrive shaft 80 fixedly coupled to gear element 30' for joint rotation with the output shaft 79. The overdrive shaft 80 is coupled to gear element 82, which is in meshing rotation with gear element 84. A clutch 86 is operable to selectively couple gear element 84 to the engine 16'. In a preferred embodiment, the clutch 86 is a dog clutch or an electronically controlled hydraulic rocker one-way clutch. Meshing gearing elements 84 and 82 have a fixed gear ratio configured to define an overdrive speed and torque relationship between the engine 16' and the output shaft 79 when the clutch 86 is engaged. A controller 88 is configured to selectively command the clutch 86 to engage or disengage in response to various operating conditions, as will be discussed below with respect to FIG. 4. Other gearing arrangements that impose an overdrive speed relationship between the engine 16' and output shaft 79 may, of course, be used.

Figure 4:
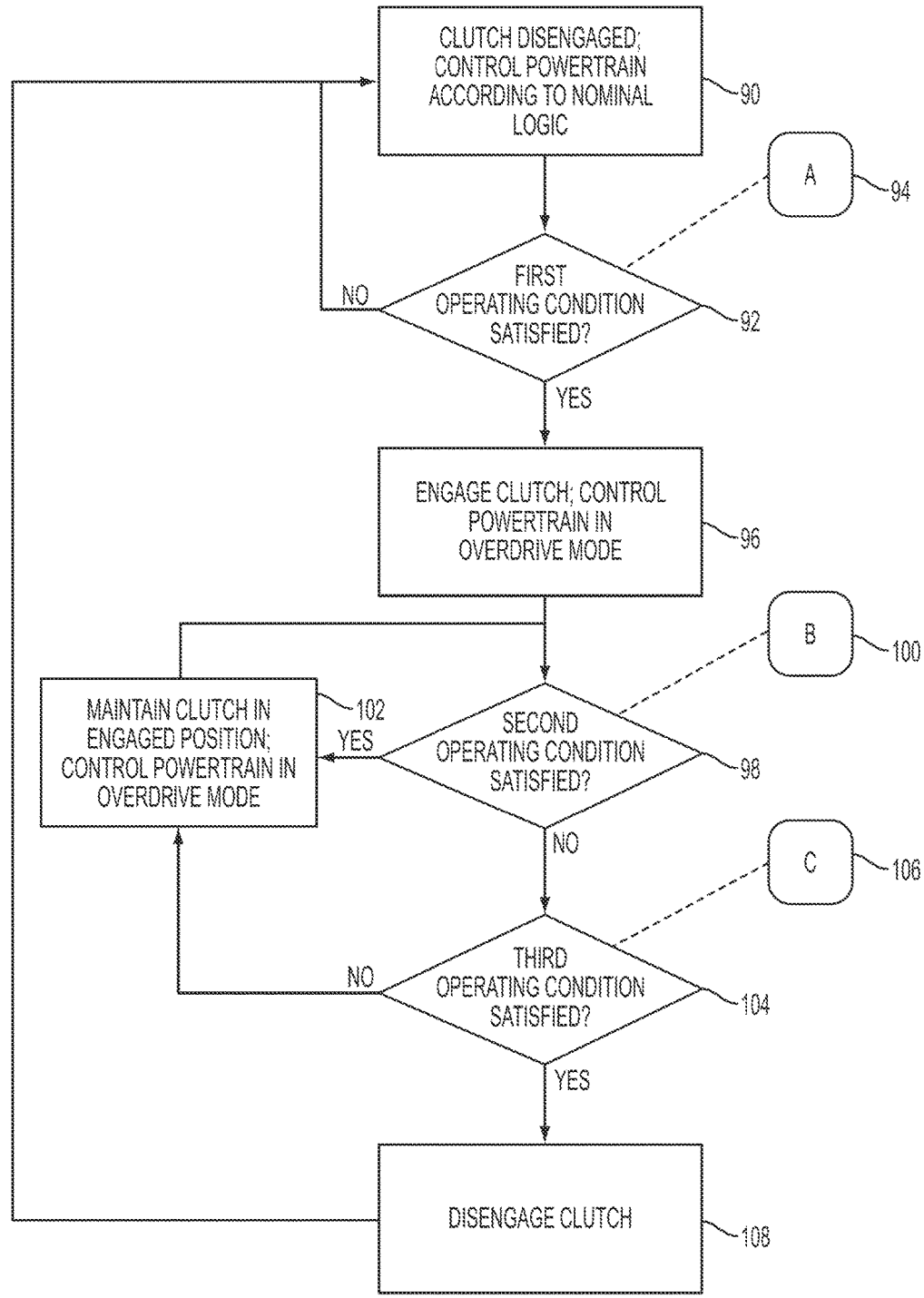
FIG. 4 illustrates a method of controlling a powertrain according to the present disclosure in flowchart form.
Figure 4:
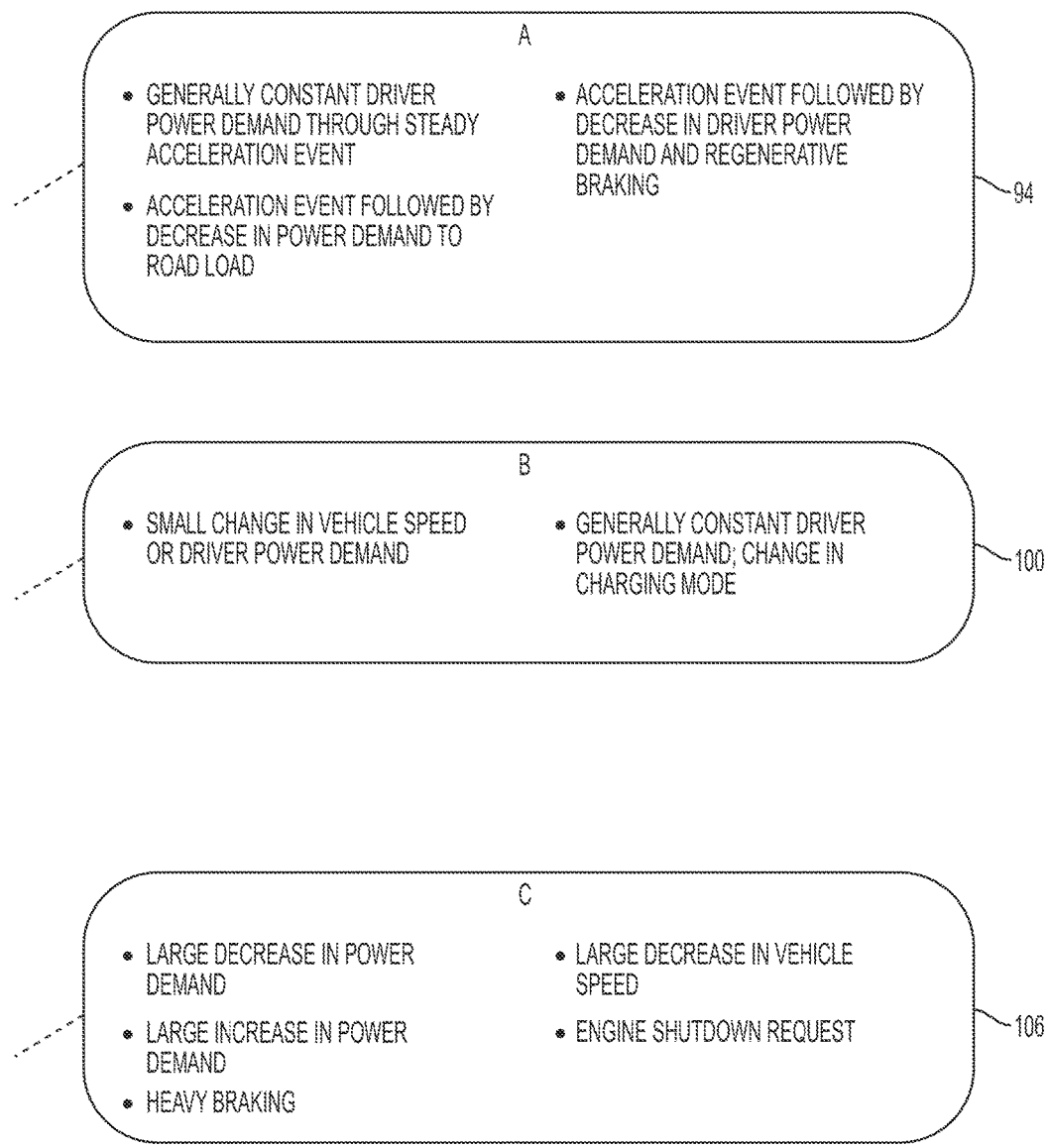

Referring now to FIG. 4, a method of controlling operation of the powertrain is illustrated in flowchart form. The hybrid vehicle powertrain is operated according to a nominal logic with the clutch disengaged, as illustrated at block 90. A determination is then made of whether a first operating condition is satisfied, as illustrated at operation 92. The first operating condition generally corresponds to a change from non-steady state operation to steady state operation, or to a decrease in magnitude of a difference between a driver power demand and the road load. The first operating condition may be one of the operating conditions of list A, illustrated at block 94. The first operating condition may be a generally constant driver power demand through a first steady acceleration event. The first operating condition may also be a second acceleration event followed by a decrease in power demand to be generally equal to road load. The first acceleration event may also be a third acceleration event followed by a decrease in driver power demand and activation of regenerative braking It should be noted that with respect to the acceleration events, "first", "second", and "third" are used for the sake of clarity, and not to indicate any sequence or requirement of co-incidence. If the first operating condition is not satisfied, control returns to block 90. If the first operating condition is satisfied, the clutch is engaged and the powertrain is controlled in overdrive mode, as illustrated at block 96.

A determination is then made of whether a second operating condition is satisfied, as illustrated at operation 98. The second operating condition generally corresponds to continuing in steady state operation, or to a generally constant difference between driver power demand and road load. The second operating condition may be one of the operating conditions of list B, illustrated at block 100. The second operating condition may include a small deviation in vehicle speed or driver power demand. In some embodiments, a speed deviation threshold or power demand deviation threshold may be provided. In such embodiments, speed or power demand deviations that do not exceed the respective thresholds may satisfy the second operating condition. The second operating condition may also be a generally constant driver power demand with a change in vehicle charging mode. In some speed and torque ranges charging is more efficient using a motor, and in other ranges charging is more efficient using a generator. A switch from motor charging to generator charging or from generator charging to motor charging, in conjunction with a generally constant driver power demand, would thus satisfy the second operating condition. Similarly, a change from a "not charging" mode to a charging mode, in conjunction with a generally constant driver power demand, would thus satisfy the second operating condition. If a determination is made that the second operating condition is satisfied, then the clutch is maintained in the engaged position, as illustrated at block 102. Control then returns to operation 98. The powertrain is thus controlled in overdrive mode while steady state operation continues.

If a determination is made that the second operating condition is not satisfied, then a determination is made of whether a third operating condition is satisfied, as illustrated at block 104. The third operating condition generally corresponds to a change from steady state operation to non-steady state operation, or to an increase in magnitude of the difference between driver power demand and road load. The third operating condition may be one of the operating conditions of list C, illustrated at block 106. The third operating condition may be a large decrease in power demand or a large increase in power demand. In some embodiments, a power demand deviation threshold is provided, and the third operating condition is satisfied if a driver power demand deviation exceeds the threshold. This may include a first threshold for decreases in power demand and a second threshold for increases in power demand. The third operating condition may also be a heavy application of vehicle brakes. In some embodiments, a braking threshold is provided, and the third operating condition is satisfied if a driver brake application exceeds the threshold. The third operating condition may also be a large decrease in vehicle speed. In some embodiments, a speed deviation threshold is provided, and the third condition is satisfied if a decrease in vehicle speed exceeds the threshold. The third operating condition may be an engine shutdown request. If a battery state of charge is sufficient to support electric operation and an engine shutdown request is issued, the third condition is satisfied. If a determination is made that the third operating condition is not satisfied, control proceeds to block 102. If the third operating condition is satisfied, the clutch is disengaged, as illustrated at block 108. Control then returns to block 90.

Figure 5:
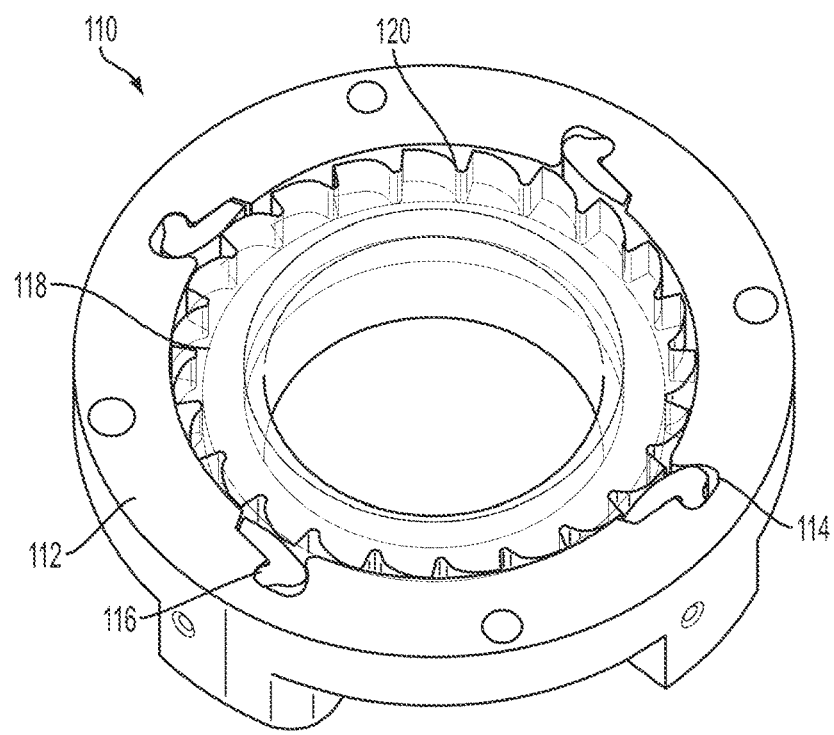
FIG. 5 is a schematic view of an electromagnetic one-way clutch.
Figure 6:
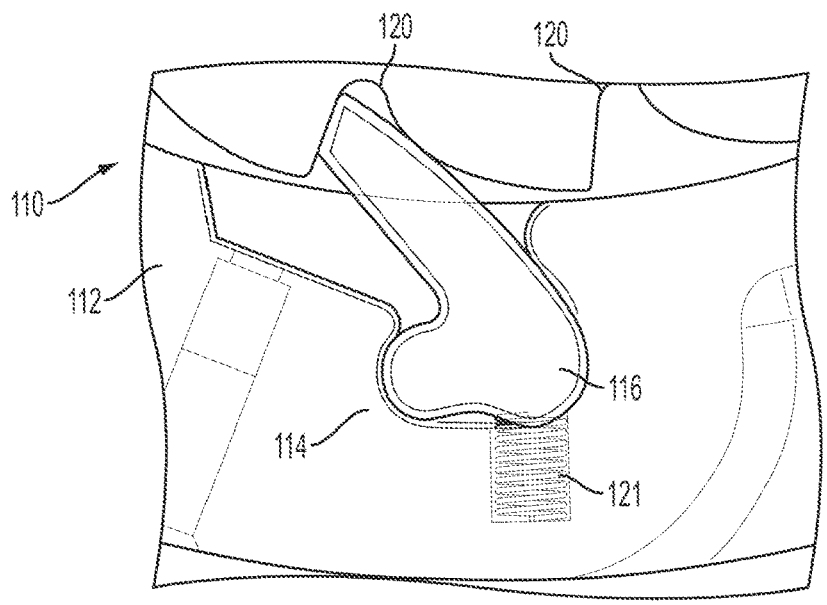
FIG. 6 is a detail view of an electromagnetic one-way clutch.

Referring now to FIGS. 5 and 6, an electromagnetic one-way clutch 110 as may be used in conjunction with the present disclosure is illustrated schematically. The one-way clutch 110 includes a rocker plate 112 having pockets 114, each pocket 114 containing a corresponding rocker 116 which is pivotally hinged within the respective pockets 114. The clutch 110 also includes a cam plate 118, which has a plurality of notches 120 that define teeth. When the rockers 116 are pivoted relative to the pockets 114, the teeth may catch inwardly extending portions of the rockers 116. The rockers 116 are biased by a spring 121 to remain within the pockets without protruding. In this configuration, there is no engagement between the rockers 116 and the notches 120, and thus no torque is transferred between the rocker plate 112 and cam plate 118. FIG. 5 illustrates the clutch 110 in this disengaged position.

The cam plate 118 contains a coil [not illustrated] that may be selectively electrified to produce a magnetic force and engage the clutch 110. In response to the magnetic force, the rockers 116 pivot outward from the pockets 114, against the bias force of the spring 121, such that a portion of the rockers 116 protrudes beyond a radially inward face of the rocker plate 112. The protruding portion of the rockers 116 may engage with the notches 120 and transfer torque between the rocker plate 112 and cam plate 118 in one direction of rotation. FIG. 6 illustrates the clutch 110 in this engaged position.

Referring now to FIGS. 7a and 7b, methods of engaging a clutch are illustrated as may be used in conjunction with the present disclosure. FIG. 7a illustrates a method of engaging a one-way clutch. The generator is controlled to overrun the clutch, as illustrated at block 122. This may be performed by rotating the rocker plate in a disengagement direction. The clutch is then activated, as illustrated at block 124. As discussed above with respect to FIG. 6, this may include electrifying a coil to produce a magnetic field, in response to which rockers pivot and engage with notches in a cam plate. The clutch is then engaged, as illustrated at block 126. This is performed by rotating the rocker plate a short distance in an engagement direction to engage rockers with teeth in the cam plate. Torque carried by the generator is then transferred to the clutch, as illustrated at block 128.

FIG. 7b illustrates a method of engaging a dog clutch. A generator speed is controlled to a target speed to synchronize with the clutch, as illustrated at block 130. The clutch is then engaged, as illustrated at block 132. Torque carried by the generator is then transferred to the clutch, as illustrated at block 134.

Referring now to FIGS. 8a and 8b, methods of disengaging a clutch are illustrated as may be used in conjunction with the present disclosure. FIG. 8a illustrates a method of disengaging a one-way clutch. Torque carried by the clutch is transferred to the generator, as illustrated at block 136. The generator is controlled to overrun the clutch, as illustrated at block 138. This may be performed by rotating the generator in the disengagement direction. The clutch is then deactivated, as illustrated at block 140. Generator control is then returned to nominal operation, as illustrated at block 142.

FIG. 8b illustrates a method of disengaging a dog clutch. Torque carried by the clutch is transferred to the generator, as illustrated at block 144. The clutch is then disengaged, as illustrated at block 146. Generator control is then returned to nominal operation, as illustrated at block 148.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid vehicle comprising:
   an internal combustion engine;
   a first electric machine;
   traction wheels;
   an output shaft drivingly coupled to the traction wheels by a gearing arrangement configured to establish a final drive ratio between the output shaft and the traction wheels;
   a second electric machine drivingly coupled to the output shaft;
   a first gearing arrangement configured to selectively transmit torque from the engine and first electric machine to the output shaft;
   a second gearing arrangement configured to selectively transmit torque from the engine to the output shaft in an overdrive speed and torque relationship, the second gearing arrangement including a clutch; and
   a controller configured to engage the clutch in response to an acceleration event followed by a decrease in power demand; and
   disengage the clutch in response to a third operating condition.

2. The hybrid vehicle of claim 1, wherein the clutch is a dog clutch.

3. The hybrid vehicle of claim 1, wherein the clutch is an electromagnetic one-way clutch.

4. The hybrid vehicle of claim 1, wherein the controller is further configured to maintain the clutch in an engaged position in response to a second operating condition, the second operating condition comprising a change in a vehicle charging mode.

5. The hybrid vehicle of claim 1, wherein the third operating condition is:
   a decrease in driver power demand, the decrease exceeding a first associated threshold;
   receiving a brake pedal position signal exceeding a second associated threshold;
   an increase in driver power demand, the increase exceeding a third associated threshold;
   a generally constant driver power demand and a decrease in vehicle speed, the decrease exceeding a fourth associated threshold; or
   an engine shutdown request.

6. A method of controlling a hybrid vehicle having a powersplit powertrain and an overdrive mechanical linkage selectively engageable to transmit engine torque to the wheels in a fixed speed relationship, the method comprising:
   operating the powersplit powertrain in a continuously variable mode; and
   engaging the overdrive mechanical linkage in response to an acceleration event followed by a decrease in power demand.

7. The method of claim 6, wherein the powersplit powertrain includes a generator and the overdrive mechanical linkage includes an electromagnetic one-way clutch selectively coupled to the engine, and wherein engaging the overdrive mechanical linkage comprises:
   overrunning the clutch by rotating the generator in a disengagement direction;
   electronically activating the one-way clutch while overrunning;
   engaging the activated clutch by rotating the generator in an engagement direction until the clutch is engaged to prevent further rotation in the engagement direction;
   transferring engine torque carried by the generator to the activated clutch; and
   turning off the generator after the engine torque is transferred.

8. The method of claim 6, wherein the powersplit powertrain includes a generator and the overdrive mechanical linkage includes a dog clutch selectively coupled to the engine, and wherein engaging the overdrive mechanical linkage comprises:
   controlling the generator according to a target speed range to synchronize the clutch;
   engaging the clutch;
   transferring engine torque carried by the generator to the engaged clutch; and
   turning off the generator after the engine torque is transferred.

9. The method of claim 6, further comprising:
   in response to the overdrive mechanical linkage being engaged and a second operating condition, maintaining the overdrive mechanical linkage in an engaged state.

10. The method of claim 9, wherein the second operating condition comprises a change in a vehicle charging mode.

11. The method of claim 9, further comprising:
    in response to the overdrive mechanical linkage being engaged and a third operating condition, disengaging the overdrive mechanical linkage to de-establish the overdrive speed relationship.

12. The method of claim 11, wherein the third operating condition is:
    a decrease in driver power demand, the decrease exceeding a first associated threshold;
    an actuation of a brake pedal exceeding a second associated threshold;
    an increase in driver power demand, the increase exceeding a third associated threshold;
    a generally constant driver power demand and a decrease in vehicle speed, the decrease exceeding a fourth associated threshold; or
    an engine shutdown request.

13. The method of claim 11, wherein the powersplit powertrain includes a generator and the overdrive mechanical linkage includes an electromagnetic one-way clutch selectively coupled to the engine, and wherein disengaging the overdrive mechanical linkage comprises:
    turning on the generator while the clutch is activated and engaged;
    rotating the generator to overrun and disengage the clutch; and
    deactivating the clutch while overrunning.

14. The method of claim 11, wherein the powersplit powertrain includes a generator and the overdrive mechanical linkage includes a dog clutch selectively coupled to the engine, and wherein disengaging the overdrive mechanical linkage comprises:
    turning on the generator while the clutch is engaged;
    transferring torque to the generator from the clutch; and
    disengaging the clutch.

15. A hybrid vehicle powertrain comprising:
    an engine;
    an electric machine;
    a first mechanical linkage, including a planetary gearset, configured to selectively transmit engine torque to vehicle traction wheels and selectively transmit electric machine torque to the wheels;
    a second mechanical linkage configured to selectively transmit engine torque to the wheels, the second mechanical linkage defining a fixed speed relationship between the engine and the wheels when transmitting torque; and
    a controller configured to engage the second mechanical linkage in response to an acceleration event followed by a decrease in power demand.

16. The hybrid vehicle of claim 15, wherein the controller is further configured to maintain the second mechanical linkage in an engaged position to operate the powertrain in an overdrive mode during a change in vehicle charging mode.

17. The hybrid vehicle of claim 15, wherein the controller is further configured to disengage the second mechanical linkage to exit overdrive mode in response to:
    a decrease in driver power demand, the decrease exceeding a first associated threshold;
    an actuation of a brake pedal exceeding a second associated threshold;
    an increase in driver power demand, the increase exceeding a third associated threshold;
    a generally constant driver power demand and a decrease in vehicle speed, the decrease exceeding a fourth associated threshold; or
    an engine shutdown request.

* * * * *